US012639252B2

(12) United States Patent
   Kuo et al.

(10) Patent No.:    US 12,639,252 B2
(45) Date of Patent:        May 26, 2026

(54) CONTROL CHIP, OPERATING CIRCUIT, AND INTERFACE SIMULATION METHOD

(71) Applicant: Nuvoton Technology Corporation, Hsinchu Science Park (TW)

(72) Inventors: Huei-Jen Kuo, Jhubei City (TW); Jen-Chih Liu, Kaohsiung City (TW); Chieh-Sheng Tu, Hsinchu Science Park (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 8 days.

(21) Appl. No.: 18/963,967

(22) Filed: Nov. 29, 2024

(65) Prior Publication Data

US 2025/0245185 A1     Jul. 31, 2025

(30) Foreign Application Priority Data

Jan. 31, 2024    (TW) ................................. 113103761

(51) Int. Cl.
   *G06F 13/42*          (2006.01)
(52) U.S. Cl.
   CPC .. *G06F 13/4282* (2013.01); *G06F 2213/0002* (2013.01)
(58) Field of Classification Search
   None
   See application file for complete search history.

(56) References Cited

U.S. PATENT DOCUMENTS

| | | | | |
|---|---|---|---|---|
| 7,092,041 | B2 * | 8/2006 | Lendaro ................... | H04N 5/44 |
| | | | | 710/316 |
| 10,152,447 | B2 * | 12/2018 | Lai ....................... | G06F 13/4081 |
| 10,340,896 | B1 * | 7/2019 | Chung ................. | H03K 17/002 |
| 2007/0143512 | A1 * | 6/2007 | Kuo ..................... | G06F 13/4291 |
| | | | | 710/110 |
| 2009/0193165 | A1 * | 7/2009 | Hsieh .................. | G06F 13/4291 |
| | | | | 710/110 |
| 2012/0005385 | A1 * | 1/2012 | Hsu ..................... | G06F 13/4022 |
| | | | | 710/110 |
| 2017/0168972 | A1 * | 6/2017 | Liu ...................... | G06F 13/4282 |
| 2022/0276980 | A1 * | 9/2022 | Mizutani ............. | G06F 13/4282 |

FOREIGN PATENT DOCUMENTS

| | | |
|---|---|---|
| CN | 103235767 A | 8/2013 |
| CN | 105426331 A | 3/2016 |
| CN | 105740190 A | 7/2016 |

* cited by examiner

*Primary Examiner* — Elias Mamo
(74) *Attorney, Agent, or Firm* — MUNCY, GEISSLER, OLDS & LOWE, P.C.

(57)          ABSTRACT

A control chip including a communication interface, a serial interface, and a control logic is provided. The communication interface is configured to receive an access package. The serial interface includes a first pin and a second pin. The first and second pins operate in an alternate function mode. The control logic is coupled to the serial interface. In response to the access package having a read operation code, the control logic uses the first pin to output the read operation code and read information to a slave device and sets the first pin to operate in a general-purpose input-output (GPIO) mode. The slave device provides read data according to the read information. The control logic uses the second pin to receive the read data.

20 Claims, 6 Drawing Sheets

200

| PRE | ST | OP | AD_S | AD_R | TA | DA |
|-----|----|----|------|------|----|----|

FIG. 2

CONTROL CHIP, OPERATING CIRCUIT, AND INTERFACE SIMULATION METHOD

CROSS REFERENCE TO RELATED APPLICATIONS

This application claims priority of Taiwan Patent Application No. 113103761, filed on Jan. 31, 2024, the entirety of which is incorporated by reference herein.

BACKGROUND OF THE INVENTION

Field of the Invention

The present invention relates to a control chip, and, in particular, to a control chip that uses a serial interface to simulate a management data input-output (MDIO) interface.

Description of the Related Art

In general, control chips usually have many communication interfaces for connecting to many external circuits. Each external circuit has a corresponding communication interface that can be coupled to the control chip. However, when the type of communication interface of the external circuit is different from the type of communication interface of the control chip, the control chip cannot communicate with the external circuit.

BRIEF SUMMARY OF THE INVENTION

In accordance with an embodiment of the disclosure, a control chip comprises a communication interface, a serial interface, and a control logic. The communication interface is configured to receive an access package. The serial interface comprises a first pin and a second pin. The first and second pins operate in an alternate function mode. The control logic is coupled to the serial interface. In response to the access package having a read operation code, the control logic uses the first pin to output the read operation code and read information to a slave device and sets the first pin to operate in a general-purpose input-output (GPIO) mode. The slave device provides read data according to the read information. The control logic uses the second pin to receive the read data.

In accordance with another embodiment of the disclosure, an operating circuit comprises a control chip and a slave device. The control chip comprises a communication interface, a serial interface, and a control logic. The communication interface is configured to receive an access package. The serial interface comprises a first pin and a second pin. The first and second pins operate in an alternate function mode. The control logic is coupled to the serial interface. The slave device comprises a management data input-output interface. The management data input-output interface comprises a bidirectional data pin coupled to the first and second pins. In response to the access package having a read operation code, the control logic uses the first pin to output the read operation code and read information to the bidirectional data pin and sets the first pin to operate in a GPIO mode. The slave device provides read data according to the read information. The control logic uses the second pin to receive the read data.

An interface simulation method to simulate a serial interface to a management data input-output interface is provided. The serial interface comprises a first pin and a second pin which operate in an alternate function mode. An exemplary embodiment of the interface simulation method is described in the following paragraph. An access package is received. A determination is made as to whether the access package has a write operation code. In response to the access package having the write operation code, the first pin is used to output write information to a slave device. In response to the access package not having the write operation code, the first pin is used to output read information to the slave device, the first pin is set to operate in a GPIO mode, and the second pin is used to receive read data from the slave device.

The interface simulation method may be practiced by the systems which have hardware or firmware capable of performing particular functions and may take the form of program code embodied in a tangible media. When the program code is loaded into and executed by an electronic device, a processor, a computer or a machine, the electronic device, the processor, the computer or the machine becomes a control logic, a control chip, and an operating circuit for practicing the disclosed method.

BRIEF DESCRIPTION OF THE DRAWINGS

The present invention can be more fully understood by reading the subsequent detailed description and examples with references made to the accompanying drawings, wherein:

FIG. 2 is a schematic diagram of an exemplary embodiment of a package format transmitted by a pin according to various aspects of the present disclosure.

DETAILED DESCRIPTION OF THE INVENTION

Figure 1:
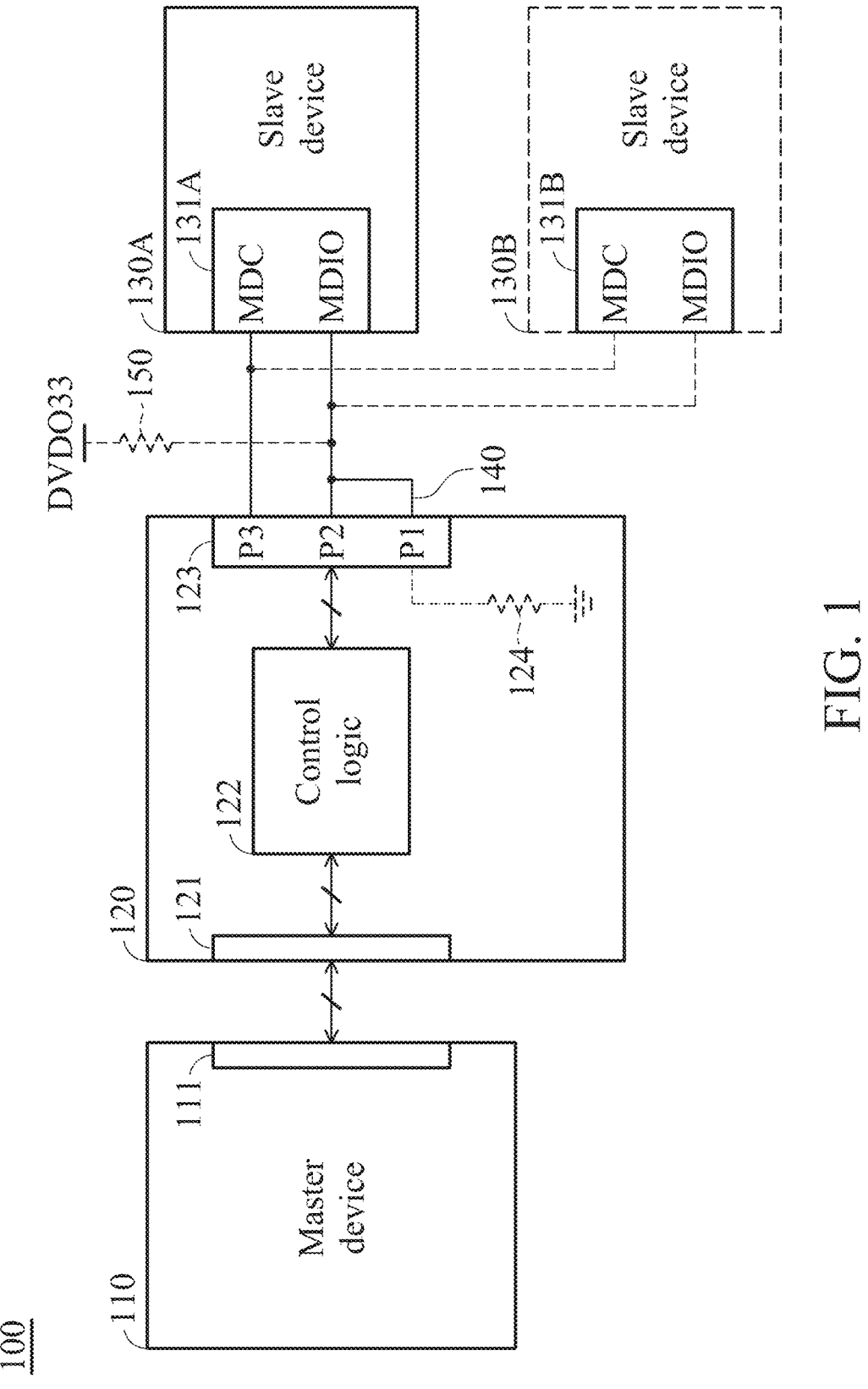
FIG. 1 is a schematic diagram of an exemplary embodiment of an operating circuit according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an operating circuit according to various aspects of the present disclosure. The operating circuit 100 comprises a master device 110, a control chip 120, and a slave device 130A. The master device 110 comprises a communication interface 111. The communication interface 111 is coupled to the control chip 120. The master device 110 outputs packages to the control chip 120 and receives responses from the control chip 120 via the communication interface 111. In this embodiment, the communication interface 111 is used as a master interface. The kind of communication interface 111 is not limited in the present disclosure. In one embodiment, the communication interface 111 is a serial interface, such as an inter-integrated circuit (I2C) bus interface, a second serial peripheral interface (SPI), a universal serial bus (USB) interface, a universal asynchronous receiver-transmitter (UART), or a controller area network (CAN) interface.

The control chip 120 comprises a communication interface 121, a control logic 122, and a serial interface 123. The communication interface 121 is coupled to the communication interface 111. The control logic 122 receives the package provided by the master device 110 via the communication interface 121 and operates according to the package sent by the master device 110. In this embodiment, the communication interface 121 is used as a slave interface. The kind of communication interface 121 is not limited in the present disclosure. The kind of communication interface 121 may be the same as the kind of communication interface 111. For example, the communication interface 121 may be one of an I2C interface, an SPI interface, a USB interface, a UART interface and a CAN interface.

The serial interface 123 is coupled to the slave device 130A. The control logic 122 uses the serial interface 123 to output an access package to the slave device 130A and receive a response of the slave device 130A. In this case, the serial interface 123 is used as a master interface. The kind of serial interface 123 is not limited in the present disclosure. The kind of serial interface 123 may be the same as or different from the kind of serial interface 121. In one embodiment, the serial interface 123 is an SPI interface.

In this embodiment, the serial interface 123 comprises pins P1~P3. The pins P1~P3 operate in an alternate function mode. In the alternate function mode, the signals and data transmitted by the pins P1~P3 match a specific protocol, such as an I2C protocol, an SPI protocol, a USB protocol, or a UART protocol. Taking the SPI protocol as an example, when the pins P1~P3 operate in the alternate function mode, the pin P1 may be served as the MOSI pin of the SPI protocol, the pin P2 may be served as the MISO pin of the SPI protocol, and the pin P3 may be served as the CLK pin of the SPI protocol to transmit clock signals.

The control logic 122 is coupled to the serial interface 123 and controls the function state of the pin P1. For example, the control logic 122 may change the function state of the pin P1, such as from the alternate function mode to a general-purpose input-output (GPIO) mode. When the pin P1 operates in the GPIO mode, the control logic 122 may set the pin P1 to operate in an input state. At this time, the level of the pin P1 is maintained at a specific level. The circuit structure of control logic 122 is not limited in the present disclosure. Any circuit can serve as the control logic 122, as long as the circuit is capable of controlling the signals transmitted by the serial interface 123 to match a specific communication protocol.

In other embodiment, the control chip 120 further comprises an equivalent resistor 124. When the pin P1 operates in the input state of the GPIO mode, the equivalent resistor 124 is coupled to the pin P1. In this case, the equivalent resistor 124 is referred to as a pull-down resistor. The kind of equivalent resistor 124 is not limited in the present disclosure. In one embodiment, the equivalent resistor 124 is an equivalent resistance of a transistor (not shown) when it is turned on. In this case, when the pin P1 operates in the input state of the GPIO mode, the control logic 122 turns on the transistor so that the equivalent resistor 124 is coupled to the pin P1.

In some embodiments, the operating circuit 100 further comprises a connection device 140 and a pull-high resistor 150. The connection device 140 is electrically connected to the pins P1 and P2. Therefore, the levels of the pins P1 and P2 are the same. In this case, the pull-high resistor 150 is coupled to the pin P1 and receives an operation voltage DVDO33. When the pin P1 operates in the input state of the GPIO mode, the equivalent resistor 124 is coupled to the pull-high resistor 150 in series. Therefore, the pull-high resistor 150 and the equivalent resistor 124 are connected to act as a voltage divider. The voltage of the pin P1 is a divided voltage which may be half the operating voltage DVDO33.

The slave device 130A comprises a communication interface 131A. The communication interface 131A is coupled to the serial interface 123. The slave device 130A uses the serial interface 131A to receive the packages from the control chip 120 and operates according to the packages sent by the control chip 120. In one embodiment, the slave device 130A comprises a plurality of control registers (not shown). The slave device 130A writes data to the corresponding control register according to the package of the control chip 120. The slave device 130A may read the corresponding control register according to the package of the control chip 120 and then provide the read results to the control chip 120. In this embodiment, the communication interface 131A is used as a slave interface.

In one embodiment, the communication interface 131A is a management data input-output (MDIO) interface. The communication interface 131A comprises a bidirectional data pin MDIO. The bidirectional data pin MDIO is coupled to the pins P1 and P2, and the pull-high resistor 150. In one embodiment, the communication interface 131A further comprises a pin MDC. The pin MDC is coupled to the pin P3 to receive clock signals.

In other embodiments, the operating circuit 100 further comprises a slave device 130B. The slave device 130B comprises a communication interface 131B. The communication interface 131B is coupled to the serial interface 123. The slave device 130B uses the communication interface 131B to receive the packages from the control chip 120 and operates according to the packages sent by the control chip 120. In this embodiment, the communication interface 131B is a slave interface and an MDIO interface.

The kinds of slave devices 130A and 130B are not limited in the present disclosure. In one embodiment, at least one of the slave devices 130A and 130B is a photo communication chip. The slave devices 130A and 130B may be applied in a physical layer. The control chip 120 realizes the operation and management of the devices in the physical layer by reading and writing the control registers of the slave devices 130A and 130B.

For example, when an access package has a read operation code, the control logic 122 uses the pin P1 to output the read operation code and read information to the bidirectional data pin MDIO. At this time, the pin P1 operates in the alternate function mode. Then, the control logic 122 changes the operation mode of the pin P1 from the alternate function mode to the GPIO mode. Taking the slave device 130A as an example, when the read information points to the slave device 130A, the slave device 130A reads a corresponding control register to generate read data and uses the bidirectional data pin MDIO to output the read data. The control logic 122 uses the pin P2 to receive the read data from the bidirectional data pin MDIO of the slave device 130A.

In one embodiment, the control logic 122 generates an access package according to a control package sent by the master device 110 and outputs the access package to the slave device 130A or 130B. For example, when the master device 110 wants to read a specific slave device, the master device 110 sets an operation code (OP code) of a control package so that the operation code of the control package is equal to a read operation code. When the master device 110 wants to write data into a specific slave device, the master device 110 sets the operation code of the control package so that the operation code of the control package is equal to a write operation code. In this case, the control logic 122 uses the pin P1 to output the write operation code and write information to the specific slave device to direct the specific slave device to store the corresponding data. In one embodiment, the control logic 122 directly serves the control package provided by the master device 110 as an access package and provides the access package to the slave devices 130A and 130B.

In another embodiment, the access package is generated by the control logic 122. In this case, the control logic 122 generates an access package according to a predetermined value to pre-read the control registers of the slave devices 130A and 130B. The control logic 122 temporarily stores the pre-read result in a memory (not shown). In some embodiments, the control logic 122 re-reads the control registers of the slave devices 130A and 130B at regular intervals to update the data in the memory. When the master device 110 sends a read package, the control logic 122 directly provides the data stored in the memory to the master device 110, thus shortening the time for the master device 110 to wait for data.

Figure 2:
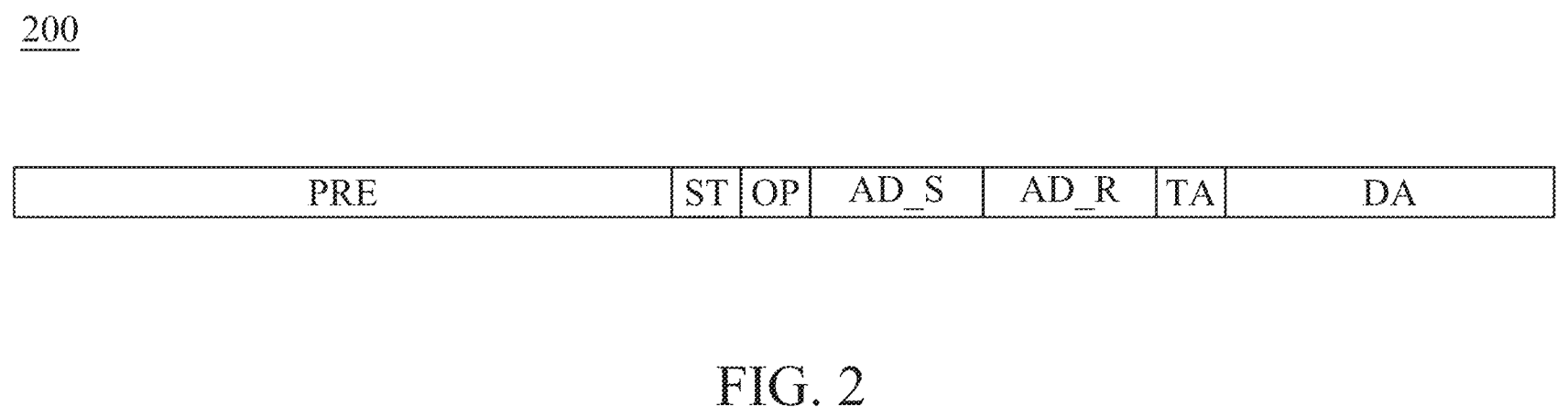

FIG. 2 is a schematic diagram of an exemplary embodiment of a package format transmitted by the pin P1 according to various aspects of the present disclosure. As shown in FIG. 2, the package 200 comprises fields PRE, ST, OP, AD_S, AD_R, TA, and DA. The field PRE comprises a plurality of preamble codes. In one embodiment, the field PRE has 32 bits and the values of the preamble codes are 1. The field ST comprises a plurality of start codes. In one embodiment, the field ST has 2 bits.

The field OP comprises a plurality of operation codes. In one embodiment, the field OP has 2 bits. For example, when the operation codes is equal to 01B (binary), it means that package 200 is a write package. Therefore, the slave device stores the data of the field DA. In this case, the data of the field DA is served as write data. When the operation codes is equal to 10B, it means that the package 200 is a read package. Therefore, the slave device provides read data. In this case, the data of the field DA is served as read data.

The field AD_S comprises a plurality of address codes to point a specific slave device. In one embodiment, the filed AD_S has 5 bits. The field AD_R comprises a plurality of address codes to point a specific control register of the specific slave device. In one embodiment, the field AD_R has 5 bits.

The field TA has 2 bits. When the filed TA does not have a specific value (e.g., Z), it means that the data of the field DA is write data. Therefore, the specific slave device stores the data of the field DA. In one embodiment, when the values of the field TA is equal to 10B, it means that the data of the field DA is write data. When the field TA comprises a specific value (e.g., Z), it means that the package 200 is a read package. Therefore, the corresponding slave device reads the corresponding control register according to the address codes of the filed AD_R and writes the read result into the field DA. In one embodiment, the specific value is the average of the value 1 and the value 0.

Figure 3A:
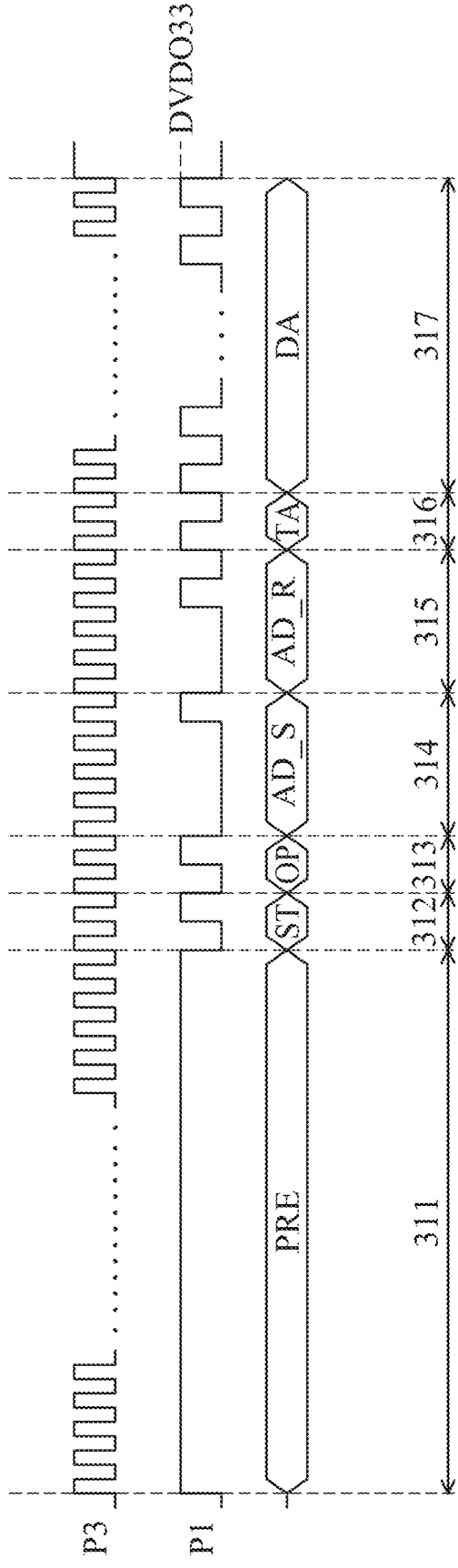
FIG. 3A is a schematic diagram of an exemplary embodiment of voltage levels of the pin transmitting a write package according to various aspects of the present disclosure.

FIG. 3A is a schematic diagram of an exemplary embodiment of voltage levels of the pin P1 transmitting a write package according to various aspects of the present disclosure. First, the pin P3 transmits clock signals. In periods 311~317, the pin P1 transmits the fields PRE, ST, OP, AD_S, AD_R, TA, and DA. In this embodiment, the values of the field OP is 01B, and the values of the field TA is 10B. The salve device 130A or 130B stores data of the field DA.

Figure 3B:
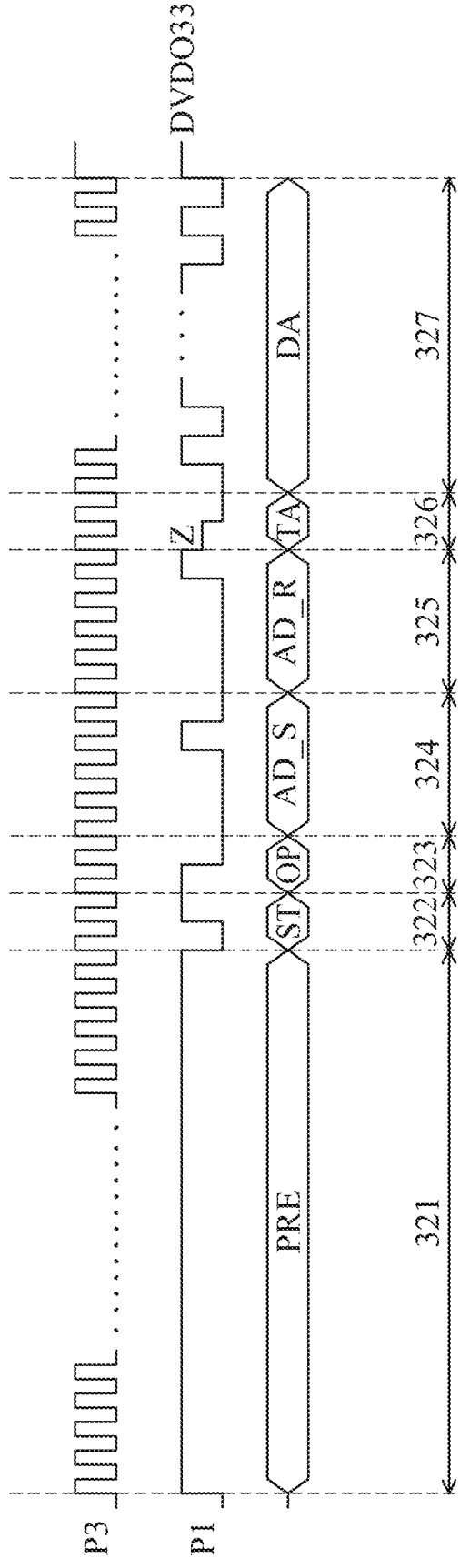
FIG. 3B is a schematic diagram of an exemplary embodiment of voltage levels of the pin transmitting a read package according to various aspects of the present disclosure.

FIG. 3B is a schematic diagram of an exemplary embodiment of voltage levels of the pin P1 transmitting a read package according to various aspects of the present disclosure. First, the pin P3 transmits clock signals. In periods 321~327, the pin P1 transmit the fields PRE, ST, OP, AD_S, AD_R, TA, and DA. In this embodiment, the values of the field OP is 10B that indicates the package transmitted by the pin P1 is a read package. Therefore, the control logic 122 sets the operation state of the pin P1 to the input state of the GPIO mode.

Refer to FIG. 1, the control logic 122 directs the equivalent resistor 124 to connect the pin P1. Since the equivalent resistor 124 is connected to the pull-high resistor 150 in series, the level of the pin P1 is the value Z which is approximately half of the operation voltage DVDO33 (e.g., 3.3/2=1.65V). Since the slave device 130A or 130B receives the value Z, the slave device 130A or 130B reads the corresponding control register according to the field AD_R and outputs the read result. In this case, the value of field DA is the read result provided by the slave device.

Figure 4:
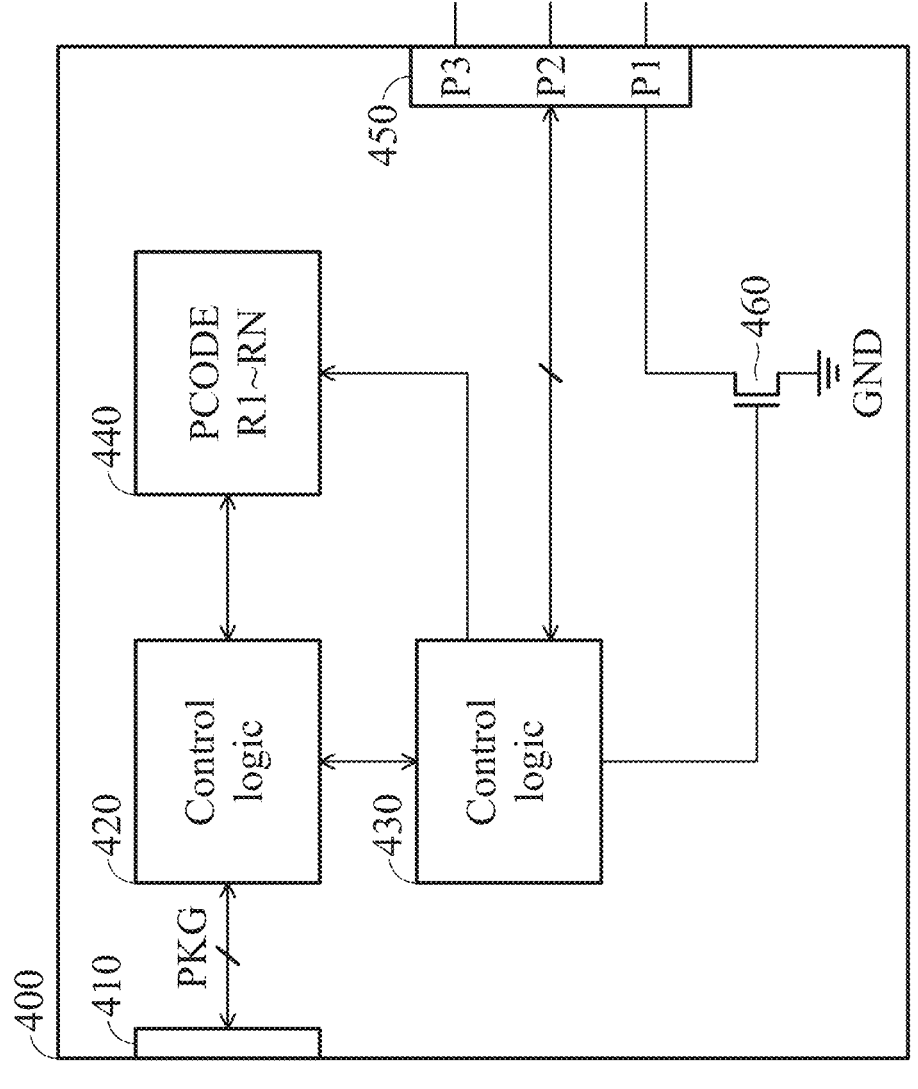
FIG. 4 is a schematic diagram of an exemplary embodiment of a control chip according to various aspects of the present disclosure.

FIG. 4 is a schematic diagram of another exemplary embodiment of the control chip according to various aspects of the present disclosure. The control chip 400 comprises a communication interface 410, control logics 420 and 430, a storage circuit 440, and a serial interface 450. Since the characteristics of the communication interface 410, the control logic 430, and the serial interface 450 shown in FIG. 4 are similar to the characteristics of the communication interface 121, the control logic 122, and the serial interface 123 shown in FIG. 1, the related description is omitted here.

The storage circuit 440 stores a program code PCODE. In one embodiment, the storage circuit 440 comprises a non-volatile memory to store the program code PCODE. The control logic 420 reads the storage circuit 440 to perform the program code PCODE. In one embodiment, the control logic 420 directs the control logic 430 to read the registers of all slave devices at regular intervals. In this case, the control logic 430 writes the read results R1 to RN to the storage device 440. When the communication interface 410 receives a read package, the control logic 430 reads at least one read result stored in the storage circuit 440 according to the address information in the read package, and outputs the read result to a master device (not shown) via the communication interface 410. In one embodiment, the storage circuit 440 has a volatile memory for storing the read results R1 to RN.

In another embodiment, the control logic 420 determines whether an access package PKG from the communication interface 410 is a correct package. When the access package PKG is a correct package, the control logic 420 provides the access package PKG to the control logic 430. The control logic 430 outputs a preamble code (i.e., the field PRE) in the access package PKG to the slave device via the pin P1, and then determines whether the access package PKG has a write operation code.

When the access package PKG has a write operation code, the control logic 430 maintains the operation mode of the pin P1 in the alternate function mode. When the access package PKG does not have a write operation code, the control logic 430 sets the operation mode of the pin P1 in the GPIO mode. In one embodiment, the control logic 430 turns on the transistor 460. In this case, when the transistor 460 is turned on, it is equivalent to an equivalent resistor coupled between the pin P1 and the ground voltage GND. Since the pin P1 is connected to an external pull-up resistor, the pin P1 has a divided voltage. When the bidirectional data pin MDIO of the slave device receives the divided voltage, the slave device reads the corresponding register and uses the bidirectional data pin MDIO to output the read result. The control logic 430 receives the read result provided by the slave device via the pin P2. In one embodiment, the control logic 430 writes the read result into the storage circuit 440.

Figure 5:
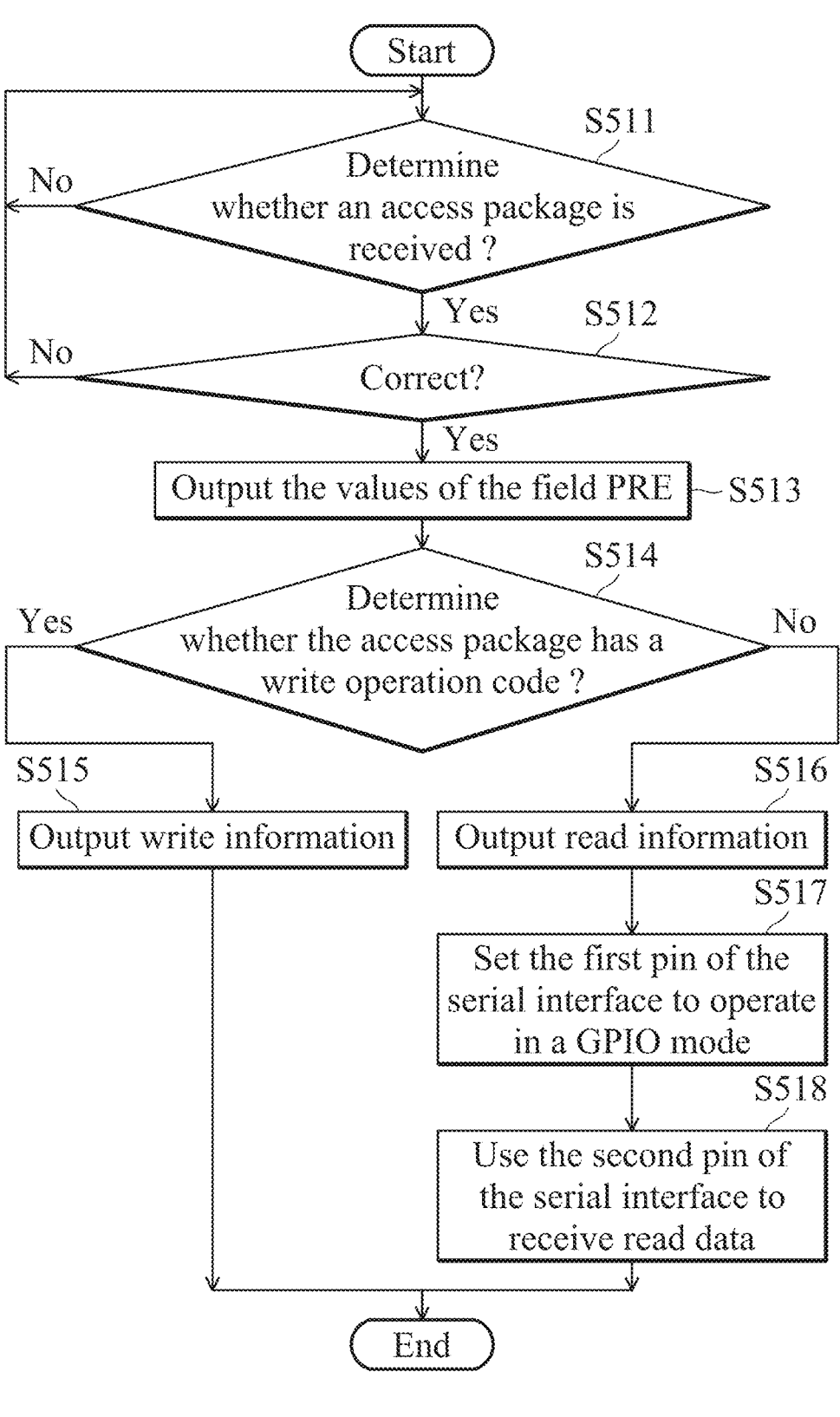
FIG. 5 is a flowchart of an interface simulation method according to various aspects of the present disclosure.

FIG. 5 is a flowchart of an interface simulation method according to various aspects of the present disclosure. The interface simulation method simulates a serial interface into an MDIO interface. The interface simulation method may take the form of a program code. When the program code is loaded into and executed by a machine such as a computer, the machine thereby becomes a control logic and a control chip for practicing the methods.

First, a determination is made as to whether an access package is received (step S511). In one embodiment, step S511 is performed to determine whether a communication interface receives an access package. The communication interface may be a serial interface, such as an I2C interface, an SPI interface, a USB interface, a UART interface or a CAN interface. If no access package is received, step S511 is re-performed.

When an access package is received, a determination is made as to whether the access package is a correct package (step S512). In one embodiment, step S512 is performed to determine whether the values of the fields PRE, ST, OP, AD_S, and AD_R are effective. Taking the filed PRE as an example, if the number of bits of the field PRE does not match a first predetermined value (e.g., 32 bits), it means that the values of the filed PRE is not effective. When the access package is a write package, the value of the field OP of the access package should be a second predetermined value, such as 01B. When the access package is a read package, the value of the field OP of the access package should be a second predetermined value, such as 10B. In this case, if the value of the field OP does not match the second or third predetermined value, it means that the parameter of the field OP is ineffective. When the fields of the access package has ineffective values, it means that the access package does not a correct package. Therefore, step S511 is re-performed.

When the access package is a correct package, a first pin of the serial interface is used to output the values of the field PRE to a bidirectional data pin of the MDIO interface of a slave device (step S513). At this time, the first pin operates in an alternate function mode. In one embodiment, the field PRE has 35 bits and the values of 35 bits are 1.

Next, a determination is made as to whether the access package has a write operation code (step S514). When the access package has a write operation code, the first pin of the serial interface is used to output write information to the slave device (step 515). In one embodiment, the write information comprises the fields ST, OP, AD_S, AD_R, TA, and DA.

When the access package does not have a write operation code, it means that the access package is a read package. Therefore, the first pin of the serial interface is used to output read information to the slave device (step S516). In one embodiment, the read information comprises the fields ST, OP, AD_S, and AD_R.

Then, the first pin of the serial interface is set to operate in a GPIO mode (step S517). In one embodiment, step S517 is performed to turn on a transistor so that the equivalent resistor of the transistor is coupled to the first pin. Therefore, the voltage level of the first pin is maintained at a fixed value, such as 1.5V. At this time, a second pin of the serial interface still operates in the alternate function mode. Next, the second pin of the serial interface is used to receive read data from the slave device (step S518).

In other embodiment, an initial operation is performed before step S511. The initial operation may initialize an oscillator circuit to generate a clock signal. In this case, a third pin of the serial interface outputs the clock signal to the slave device. The slave device receives the package from the first pin according to the clock signal. In one embodiment, the initial operation further sets a parameter of the control chip, such as a transmit receive bit length. In some embodiments, before transmitting the field PRE (i.e., step S513), the transmit receive bit length of the control chip is set to 32 bits. Before providing the read information to the slave device (i.e., before step S516), the transmit receive bit length of the control chip is 16 bits. After step S517, the transmit receive bit length of the control chip is returned to 32 bits.

In some embodiments, different interfaces (e.g., an I2C interface, an SPI interface, a USB interface, a UART interface and a CAN interface) are used to receive commands from a master device and then a serial interface (e.g., an SPI interface) is used to simulate a MDIO interface to output packages to a slave device. The existing serial interface is utilized to provide packets to the slave devices which comprises a MDIO interface. The hardware structure of the control chip does not need to be modified. Therefore, the component costs does not be increased and the availability of the control chip is improved.

It will be understood that when an element or layer is referred to as being "on", "connected to" or "coupled to" another element or layer, it can be directly on, connected or coupled to the other element or layer or intervening elements or layers may be present. In contrast, when an element or layer is referred to as be "directly on", "directly connected to" or "directly coupled to" another element or layer, there are no intervening elements or layers present.

The interface simulation method, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes a control logic, a control chip, and an operating circuit for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes a control logic, a control chip, and an operating circuit for practicing the disclosed methods. When implemented on a general-purpose processor, the program code combines with the processor to provide a unique apparatus that operates analogously to application-specific logic circuits.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control chip comprising:
a communication interface configured to receive an access package;
a first serial interface comprising:
a first pin operating in an alternate function mode; and
a second pin operating in the alternate function mode; and
a first control logic coupled to the first serial interface, wherein:
in response to the access package having a read operation code, the first control logic uses the first pin to output the read operation code and read information to a slave device and sets the first pin to operate in a general-purpose input-output (GPIO) mode,
the slave device provides read data according to the read information, and
the first control logic uses the second pin to receive the read data.

2. The control chip as claimed in claim 1, wherein the first control logic sets the first pin in an input state of the GPIO mode.

3. The control chip as claimed in claim 1, wherein in response to the second pin receiving the read data, the first control logic sets a level of the first pin so that the level of the first pin is maintained at a specific level.

4. The control chip as claimed in claim 1, wherein the communication interface is a second serial interface, and the first serial interface is a first serial peripheral interface.

5. The control chip as claimed in claim 4, wherein the second serial interface is an inter-integrated circuit (I2C) bus interface, a second serial peripheral interface, a universal serial bus (USB) interface, a universal asynchronous receiver-transmitter (UART), or a controller area network (CAN) interface.

6. The control chip as claimed in claim 1, wherein in response to the access package having a write operation code, the first control logic uses the first pin to output write data to the slave device.

7. The control chip as claimed in claim 6, further comprising:
a storage circuit storing a program code; and
a second control logic performing the program code to determine whether the access package is a correct package,
wherein in response to the access package being the correct package, the second control logic provides the access package to the first control logic.

8. The control chip as claimed in claim 7, wherein the first control logic writes the read data to the storage circuit, and the second control logic reads the storage circuit to retrieve the read data and provides the read data to a master device.

9. The control chip as claimed in claim 7, wherein:
in response to the access package being the correct package, the first control logic uses the first pin to output a preamble code to the slave device and then determines whether the access package has the write operation code,
the preamble code comprises a plurality of bits, and the value of each bit is 1.

10. The control chip as claimed in claim 1, wherein:
in response to the access package not having the write operation code, the first control logic sets the first pin to operate in the GPIO mode, in response to the access package having the write operation code, the first control logic maintains the first pin to operate in the alternate function mode.

11. An operating circuit comprising:
a control chip comprising:
a communication interface configured to receive an access package;
a first serial interface comprising:
a first pin operating in an alternate function mode; and
a second pin operating in the alternate function mode;
a first control logic coupled to the first serial interface; and
a slave device comprising:
a management data input-output interface comprising a bidirectional data pin coupled to the first and second pins,
wherein:
in response to the access package having a read operation code, the first control logic uses the first pin to output the read operation code and read information to the bidirectional data pin and sets the first pin to operate in a GPIO mode,
the slave device provides read data according to the read information,
the first control logic uses the second pin to receive the read data.

12. The operating circuit as claimed in claim 11, further comprising:
a connection device electrically connected to the first and second pins; and
a pull-high resistor coupled to the bidirectional data pin.

13. The operating circuit as claimed in claim 12, wherein in response to the first pin operating in the GPIO mode, an equivalent resistor which is connected to the pull-high resistor in series is coupled to the first pin.

14. The operating circuit as claimed in claim 13, wherein the first serial interface is a first serial peripheral interface.

15. The operating circuit as claimed in claim 11, further comprising:
a master device coupled to the communication interface, wherein the master device receives the read data via the communication interface.

16. The operating circuit as claimed in claim 15, wherein the communication interface is an I2C bus interface, a second serial peripheral interface, a USB interface, a UART interface or a CAN interface.

17. The operating circuit as claimed in claim 11, further comprising:
a storage circuit storing a program code; and
a second control logic performing the program code to determine whether the access package is a correct package,
wherein:
in response to the access package being the correct package, the second control logic provides the access package to the first control logic,
in response to the access package being the correct package, the first control logic uses the first pin to output a preamble code to the slave device and then determines whether the access package has the write operation code, and
the preamble code comprises a plurality of bits, and the value of each bit is 1.

18. The operating circuit as claimed in claim 17, wherein the first control logic writes the read data to the storage circuit, and the second control logic reads the storage circuit to retrieve the read data and provides the read data to a master device via the communication interface.

19. An interface simulation method to simulate a serial interface to a management data input-output interface, wherein the serial interface comprises a first pin and a second pin which operate in an alternate function mode, comprising:

receiving an access package;

determining whether the access package has a write operation code;

using the first pin to output write information to a slave device in response to the access package having the write operation code;

in response to the access package not having the write operation code:

using the first pin to output read information to the slave device;

setting the first pin to operate in a GPIO mode; and using the second pin to receive read data from the slave device.

20. The interface simulation method as claimed in claim 19, further comprising:

maintaining a level of the first pin at a fixed level in response to the first pin operating in the GPIO mode.

* * * * *